United States Patent
Ye et al.

(10) Patent No.: US 11,079,216 B2
(45) Date of Patent: Aug. 3, 2021

(54) CHAIN INTELLIGENT PRE-TENSIONING AND CHAIN LENGTH DETECTION METHOD AND DEVICE THEREOF

(71) Applicant: HANGZHOU DONGHUA CHAIN GROUP CO., LTD., Zhejiang (CN)

(72) Inventors: Bin Ye, Zhejiang (CN); Jiguang Lu, Zhejiang (CN); Lili Wang, Zhejiang (CN); Hongjun Wang, Zhejiang (CN); Jiancong Zhang, Zhejiang (CN); Bin Sun, Zhejiang (CN); Bihua Xuan, Zhejiang (CN)

(73) Assignee: HANGZHOU DONGHUA CHAIN GROUP CO., LTD., Zhejiang (CN)

( * ) Notice: Subject to any disclaimer, the term of this patent is extended or adjusted under 35 U.S.C. 154(b) by 142 days.

(21) Appl. No.: 16/467,988

(22) PCT Filed: Apr. 25, 2018

(86) PCT No.: PCT/CN2018/084404
§ 371 (c)(1),
(2) Date: Jun. 10, 2019

(87) PCT Pub. No.: WO2019/148675
PCT Pub. Date: Aug. 8, 2019

(65) Prior Publication Data
US 2021/0041224 A1 Feb. 11, 2021

(30) Foreign Application Priority Data

Jan. 30, 2018 (CN) .......................... 201810089387.0

(51) Int. Cl.
*H04N 7/18* (2006.01)
*G01B 11/03* (2006.01)
*B21L 15/00* (2006.01)

(52) U.S. Cl.
CPC ............ *G01B 11/03* (2013.01); *B21L 15/005* (2013.01)

(58) Field of Classification Search
CPC .............................. G01B 11/03; B21L 15/005
(Continued)

(56) References Cited

U.S. PATENT DOCUMENTS

| 7,117,989 B2* | 10/2006 | Weigel ................... B65G 23/44 198/810.04 |
| 8,858,374 B2* | 10/2014 | Townsend ........... F16H 19/0672 474/101 |
| 2012/0065009 A1* | 3/2012 | Mueller .................. F02B 67/06 474/101 |

FOREIGN PATENT DOCUMENTS

| CN | 101598532 | 12/2009 |
| CN | 201434666 | 3/2010 |
| CN | 202119621 | 1/2012 |
| CN | 102455248 | 5/2012 |
| CN | 102840808 | 12/2012 |

(Continued)

OTHER PUBLICATIONS

Ghonaim et al, Towards an agent oriented smart manufacturing system (Year: 2011).*

(Continued)

*Primary Examiner* — Shan E Elahi
(74) *Attorney, Agent, or Firm* — JCIP Global Inc.

(57) ABSTRACT

The disclosure relates to a chain intelligent pre-tensioning and chain length detection method and device thereof. The device includes a rack, a work platform, a pre-tensioning power device, a measuring power device, a length measuring device and a console. The console receives the information of the length measuring device to adjust and control the pre-tensioning power device. The pre-tensioning and chain length measurement adopts a combination structure of an independently operated screw loading system as well as two sets of unique straight guide rails and four pallets mounted on the guide rail. The pre-tensioning force loading (Continued)

adopts the servo system and works with decelerator and precision grinding screw for loading. The measuring force loading adopts stepper motor and works with precision grinding screw for loading. The pretension and measurement adopt two tensile force sensors, so that chain pretensioning force and the chain length measuring force can be controlled accurately.

8 Claims, 5 Drawing Sheets

(58) Field of Classification Search
USPC .......................................................... 348/135
See application file for complete search history.

(56) References Cited

FOREIGN PATENT DOCUMENTS

| | | |
|---|---|---|
| CN | 203719646 | 7/2014 |
| CN | 105547164 | 5/2016 |
| CN | 205642293 | 10/2016 |
| CN | 207923092 | 9/2018 |
| WO | 9112486 | 10/1991 |
| WO | 9514904 | 6/1995 |

OTHER PUBLICATIONS

"International Search Report (Form PCT/ISA/210) of PCT/CN2018/084404," dated Oct. 31, 2018, pp. 1-5.

* cited by examiner

CHAIN INTELLIGENT PRE-TENSIONING AND CHAIN LENGTH DETECTION METHOD AND DEVICE THEREOF

CROSS-REFERENCE TO RELATED APPLICATION

This application is a 371 application of the International PCT application serial no. PCT/CN2018/084404, filed on Apr. 25, 2018, which claims the priority benefits of China application no. 201810089387.0, filed on Jan. 30, 2018. The entirety of each of the above-mentioned patent applications is hereby incorporated by reference herein and made a part of this specification.

BACKGROUND OF THE DISCLOSURE

Field of the Disclosure

The disclosure relates to a chain intelligent pre-tensioning and chain length detection method and device thereof.

Description of Related Art

The chain pre-tensioning process is an important processing technology in the manufacturing process of chains, especially precision chains. The overall pitch error and distortion of the chain after correction assembling of chain makes the force to be uniformly applied to the component of chain and stabilize the frame of chain, thereby enhancing the flexibility of chain. By reducing the elongation amount of chain at the initial wearing stage, it is possible to achieve the advantage of making the surface of chain component to have residual stress to improve fatigue strength of chain to a significant level. The chain length precision is an important performance index of chain products, which affects the uniformity of engagement of chain and sprocket. Each batch of chain must undergo chain length detection. Pre-tensioning process causes the chain to have a certain degree of chilling phenomenon, so that the chain has certain degree of elongation, which has an effect on the chain length precision. The pre-tensioning and chain length measurement force of the same chain generally differ by more than 30 times. Domestically, currently the chain pre-tensioning and chain length measurement are performed separately on different facilities, and the pre-tensioning force and pre-tensioning time are fixed, which requires excessive human labor and facilities with low efficiency and thus making it difficult to effectively control chain length precision.

SUMMARY OF THE DISCLOSURE

Technical Problem

The first purpose of the present disclosure is to provide a chain intelligent pre-tensioning and chain length detection device with high efficiency and good quality. The second purpose of the present disclosure is to provide a chain intelligent pre-tensioning and chain length detection method.

Technical Solution

A chain intelligent pre-tensioning and chain length detection device includes a rack, a work platform, a pre-tensioning power device, a measuring power device, a length measuring device and a console. The console is located beside the rack, and the console receives the information of the length measuring device to adjust and control the pre-tensioning power device. The work platform is fixed on the top of the rack; the work platform is provided with two large guide rails in parallel, and a first elongated through hole is further provided between the two large guide rails. The pre-tensioning power device includes a servo system, a decelerator, a belt, a second screw, a second nut, a first large pallet, a first fixing block, a pre-tensioning force sensor, a second fixing block, a second large pallet and a fourth fixing block. The bottoms of the first large pallet and the second large pallet are slidably disposed on the large guide rails through a slider. One end of the first large pallet is fixed with the first fixing block, and one end of the second large pallet adjacent to the first large pallet is fixed with the second fixing block. One end of the pre-tensioning force sensor is fixed to the second fixing block, and the other end is elastically connected to the first fixing block. The servo system, the decelerator and the second screw are disposed at the bottom of the work platform through a mounting plate, the decelerator drives the second screw through the belt, and the second screw is further provided with the second nut. The second nut is fixed with the bottom of the first large pallet after penetrating through the first elongated through hole. The first large pallet can be moved linearly along the large guide rails under the driving of the servo system. The second large pallet is provided with two small guide rails in parallel, and a second elongated through hole is further provided between the two small guide rails. The measuring power device includes a stepper motor, a first screw, a first nut, a first small pallet, a measuring force sensor, a third fixing block, a second small pallet and a fourth fixing block. The bottoms of the first small pallet and the second small pallet are slidably disposed on the small guide rails. One end of the first small pallet is provided with a protrusion protruding upward; one end of the second small pallet adjacent to the first small pallet is fixed with the third fixing block, and the other end is fixed with a clamp. Two ends of the measuring force sensor are respectively fixed to the protrusion and the third fixing block, and the stepper motor and the first screw are disposed at the bottom of the second large pallet, and the first screw is further provided with a first nut. The first nut is fixed to the bottom of the first small pallet after penetrating through the second elongated through hole, and the first small pallet can be moved linearly along the small guide rails under the driving of the stepper motor. The length measuring device includes a grating ruler, a straight guide rail and an automatic measuring head disposed on one side of the work platform. A plurality of clamp fixing blocks are further distributed at equal distance on the work platform, the clamp fixing blocks are fixed on the rack. The upper surfaces of the clamp fixing blocks are lower than the work platform and covered by a cover to maintain a level of the platform. A corresponding clamp fixing block can be selected according to the specific chain length to fix the clamp.

Preferably, one end of the first fixing block is provided with a T-shaped block, and a middle portion of the first fixing block is provided with a through hole, and a connecting pillar in a middle portion of the T-shaped block is fixed to the pre-tensioning force sensor after penetrating through the through hole, and a compressing spring is provided between the T-shaped block and the first fixing block.

Preferably, two sides of the connecting pillar on the T-shaped block are provided with a plurality of first recesses for receiving the compressing springs, and a plurality of second recesses are disposed in positions on the first fixing block corresponding to the first recesses. Two ends of the compressing spring respectively abut against the bottoms of the first recesses and the second recesses.

Preferably, one end of the second large pallet away from the first large pallet is fixed with the fourth fixing block for preventing the second small pallet from sliding out of the small guide rails. The fourth fixing block is provided with a slot for the chain to pass through.

Preferably, the pre-tensioning force sensor, the measuring force sensor and a longitudinal slot of the clamp are located on the same straight line.

Preferably, the second screw and the servo system are disposed vertically on the mounting plate, and the second screw is located above the servo system.

Preferably, a side baffle is disposed respectively on an outer side of the two large guide rails of the work platform, and the two side baffles are covered by an upper panel. The upper panel is provided with concavities conforming to the movement tracks of the first large pallet and the second large pallet, and the upper panel is provided with a concavity on the clamp.

In order to achieve the above second purpose, the present disclosure adopts the following technical solutions:

A chain intelligent pre-tensioning and chain length detection method adopts the above-mentioned chain intelligent pre-tensioning and chain length detection device, and the steps are as follows:

a). Measuring an original length of a chain: Firstly, the appropriate clamp fixing block is selected according to a length of the chain to dispose a fixed end clamp, one end of the chain is connected to the clamp of the second small pallet, and the other end is connected is connected to the fixed end clamp. The servo system is activated and moves the second nut to the right through the decelerator and the second screw. When a pre-tensioning force reaches a chain tensioning and unloading force Fa, the servo system stops loading and holds still. Then the stepper motor is activated and drives the first screw to move the first nut to the right. When the measuring force reaches Fc, the stepper motor stops and maintains the measuring force to be equal to Fc. The automatic measuring head is activated and moves along the straight guide rail to "initial clear position for measurement of grating ruler", and then the automatic measuring head is moved to a clamp measuring basis surface on the second small pallet to measure a coordinate of the chain moving end. The automatic measuring head is moved to a clamp on the work platform for fixing the chain to measure a coordinate of the fixing end of the chain while automatically calculating an absolute value of a chain length. The automatic measuring head returns to a zero point and the measurement of an original chain length is completed;

b). A first pre-tensioning: The first nut is moved to the left to unload the measuring force. When the measuring force is unloaded to the chain tensioning and unloading force Fa and stops, the servo system is activated. The second nut is moved to the right. When the pre-tensioning force reaches a value F1 in a parameter table selected according to a deviation of the chain length and stops, the pre-tensioning force is maintained to a specified time, and the first pre-tensioning is completed;

c). After the first pre-tensioning, the chain length is measured: The second nut is moved to the left to unload the pre-tensioning force. When the pre-tensioning force reaches the chain tensioning and unloading force Fa, the servo system stops moving, and the stepper motor is activated. The first nut is moved to the right. When the measuring force reaches Fc, the stepper motor stops and the measuring force is maintained to be equal to Fc. The automatic measuring head is activated and moved along the straight guide rail to "initial clear position for measurement of grating ruler", and the automatic measuring head is moved to the clamp measuring basis surface on the second small pallet to measure a coordinate of a moving end of the chain. The automatic measuring head is moved to the clamp on the work platform for fixing the chain to measure the coordinate of the fixing end of the chain while automatically calculating the absolute value of the chain. The automatic measuring head returns to the zero point, and the first chain length measurement is completed. It is determined whether to perform the pre-tensioning and measurement again according to a result of chain length;

d). If it is necessary to perform the pre-tensioning and measurement again, step b) and step c) are repeated until the chain length meets a process requirement, thereby completing pre-tensioning and measurement of the chain.

Advantageous Effect

The disclosure integrates and completes the chain pre-tensioning and chain length measurement on one device, performs open pre-tensioning and chain length measurement on the chain, intelligently adjusts the pre-tensioning parameter according to the chain length measurement data so that the chain length is set within a predetermined scope, and determines whether the chain length meets the process requirement. The disclosure can complete chain clamping, intelligent pre-tensioning, chain length automatic measurement, and can automatically record and save parameters such as chain specification, pre-tensioning force, pre-tensioning time, chain length and chain length variation. The recorded data can be exported, and the recording format can be adjusted according to specific requirement. The pre-tensioning and chain length measurement adopt two sets of loading system. The pre-tensioning force loading adopts the servo system and works with decelerator and precision grinding screw for loading. The measuring force loading adopts stepper motor and works with precision grinding screw for loading. The pre-tensioning and measurement adopt two tensile force sensors, so that chain tensile force can be controlled accurately. The pre-tensioning force and the measuring force can be pre-set within a certain range according to different chain specifications. The chain length can be automatically measured by the grating ruler, feedback and analysis can be obtained and performed according to the first chain length measurement data. The pre-tensioning parameters can be selected automatically. In the second measurement of chain length after pre-tensioning, the intelligent controlling of pre-tensioning and chain length precision can be implemented for multiple times according to the previous chain length automatically selected pre-tensioning parameters, and the chain length can be grouped according to the chain length data, and it can be determined whether the chain length is qualified, thereby realizing intelligence. The chain intelligent pre-tensioning and chain length detection device is a novel and cross-level improvement for production and detection of chain products.

The disclosure greatly improves the product manufacturing efficiency, enhances the product quality, reduces the dissatisfactory yield rate, decreases the processing facilities and human labor, lowers the production capacity consumption, shortens the product processing flow, and reduces the area for production and processing.

DESCRIPTION OF EMBODIMENTS

Figure 1:
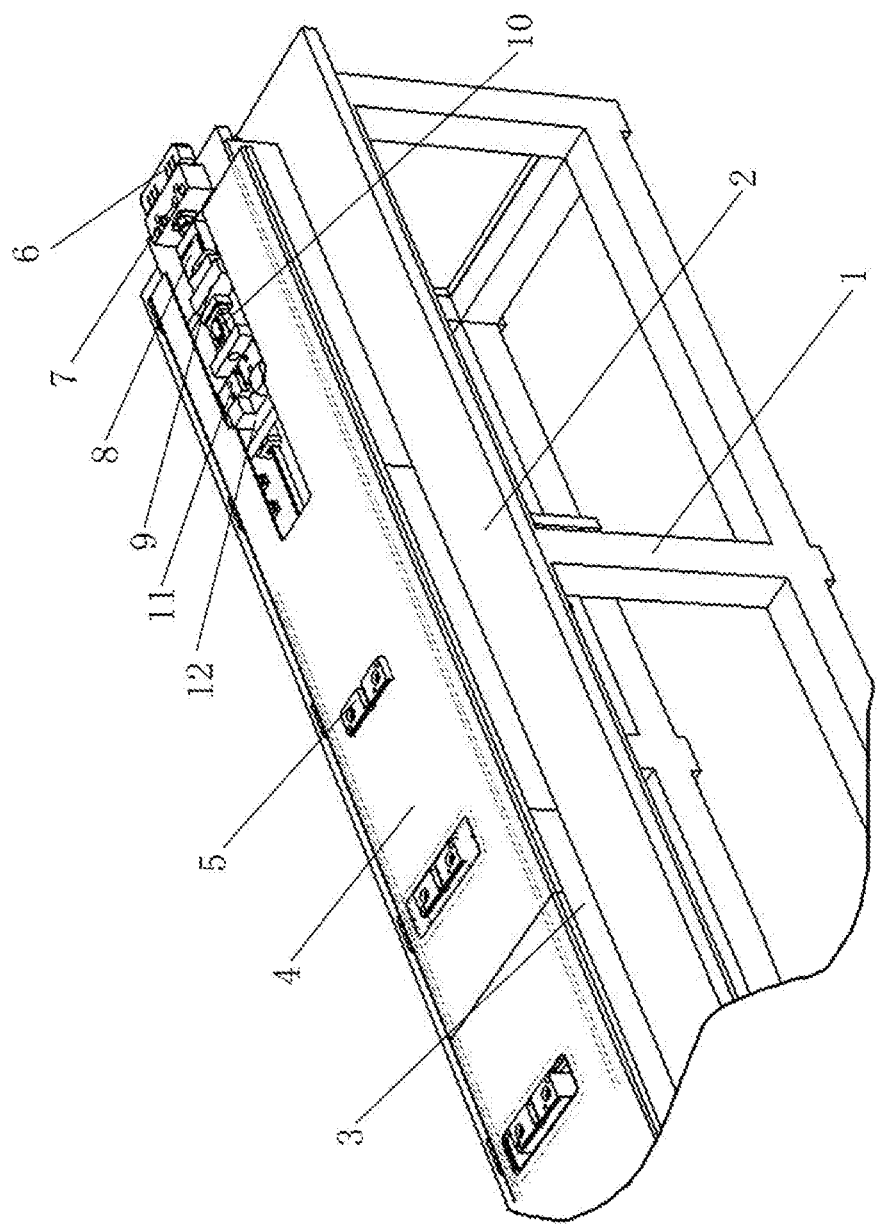
FIG. 1 is a schematic view of the overall structure of the present disclosure.

The embodiments of the present disclosure are described in detail below, and the examples of the embodiments are illustrated in the drawings, wherein the same or similar reference numerals are used to refer to the same or similar elements or elements having the same or similar functions. The embodiments described below with reference to the drawings are intended to be illustrative of the disclosure and should not to be construed as limiting.

Figure 2:
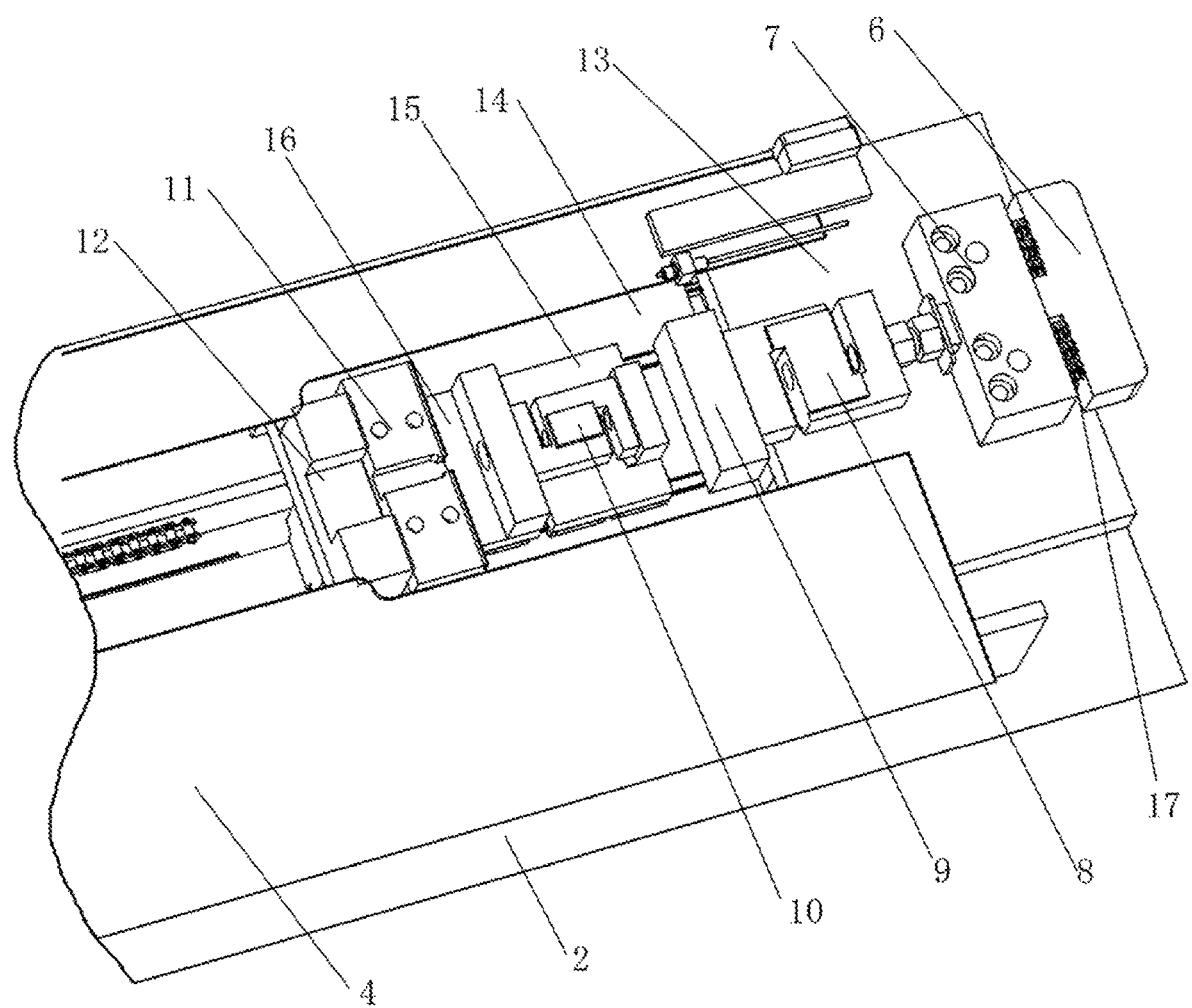
FIG. 2 is a schematic view showing the mounting structure of a pre-tensioning force sensor, a measuring force sensor, a fixing block and large/small pallets of the present disclosure.
Figure 3:
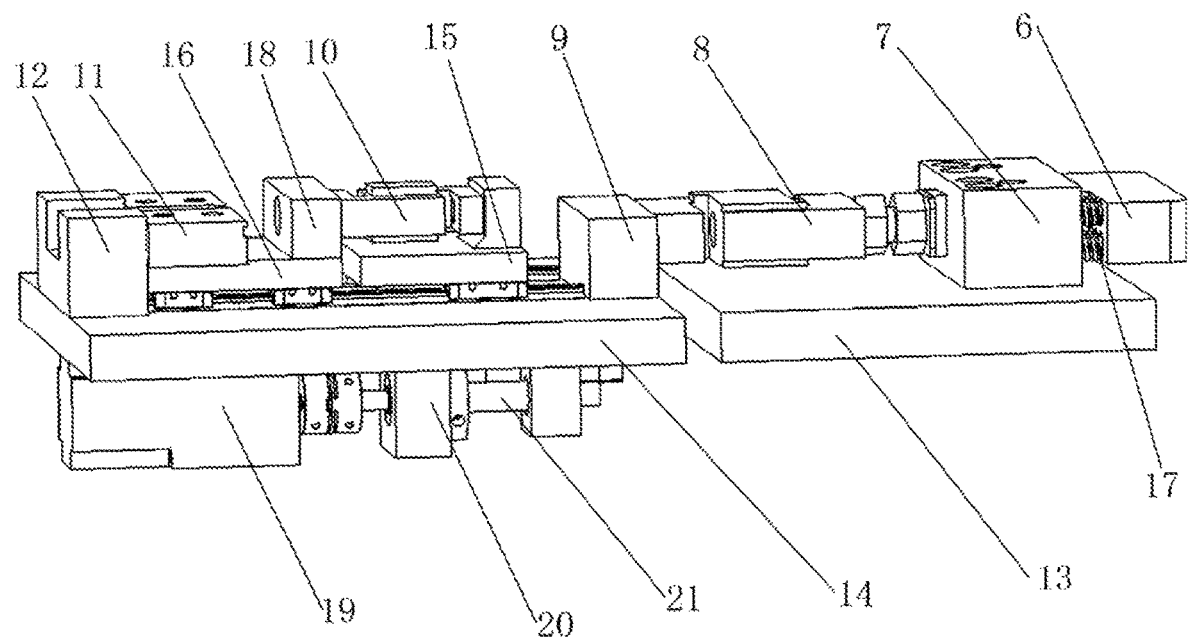
FIG. 3 is a schematic view of the structure of a measuring power device, a first large pallet, and a second large pallet of the present disclosure.
Figure 4:
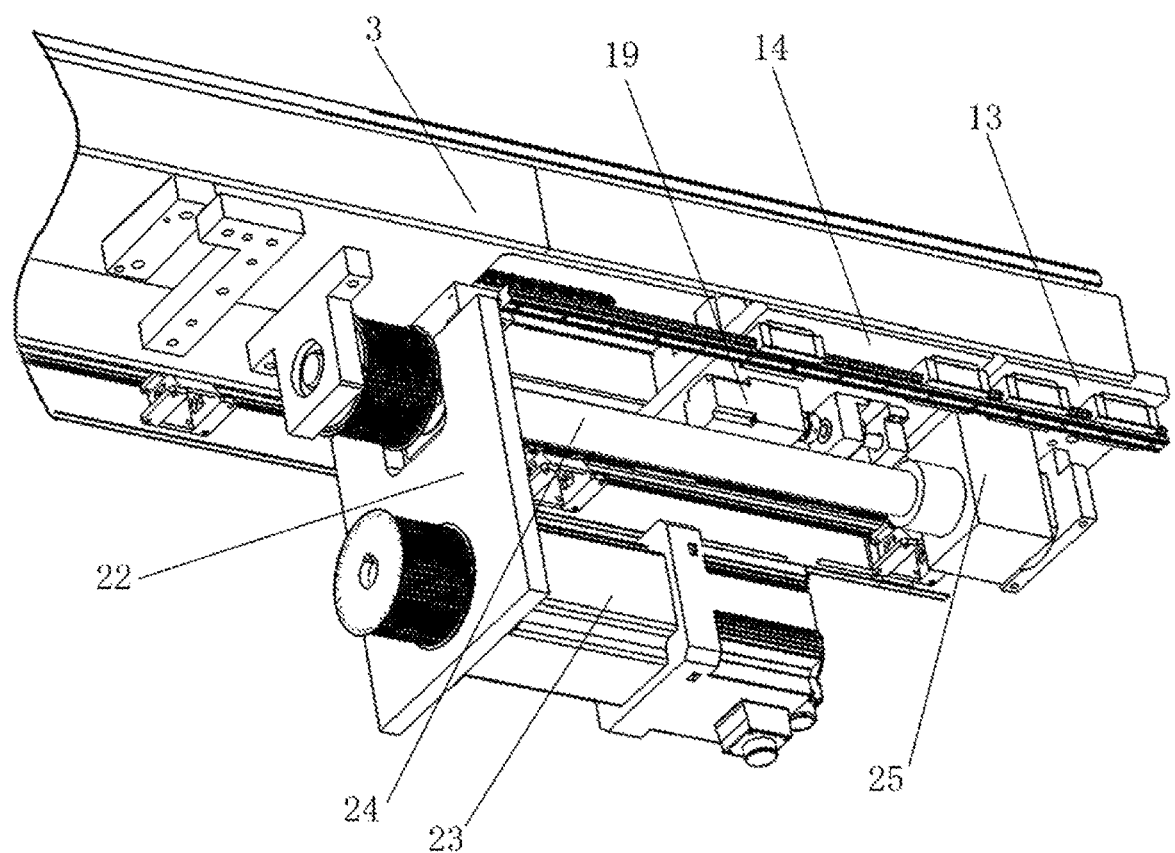
FIG. 4 is a schematic view showing the structure of a servo system, a second screw, a second nut, and a mounting plate of the present disclosure.
Figure 5:
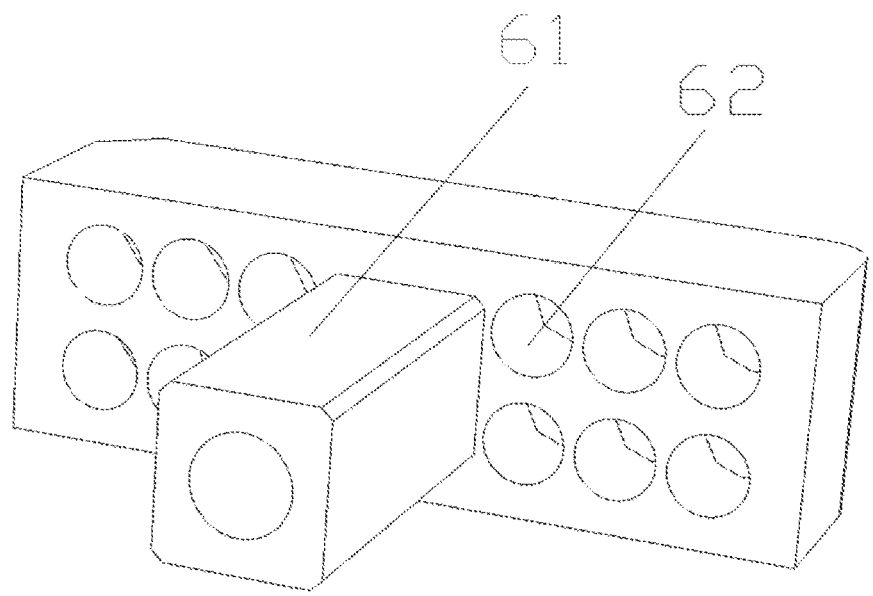
FIG. 5 is a schematic view showing the structure of a T-shaped block of the present disclosure.
Figure 6:
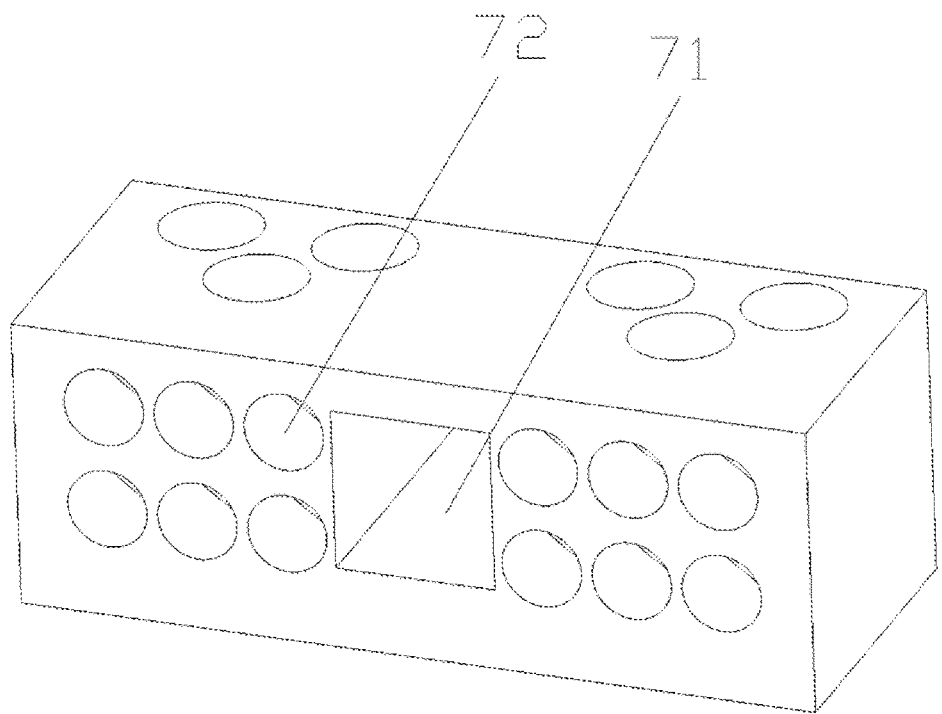
FIG. 6 is a schematic view showing the structure of a first fixing block of the present disclosure.
Figure 7:
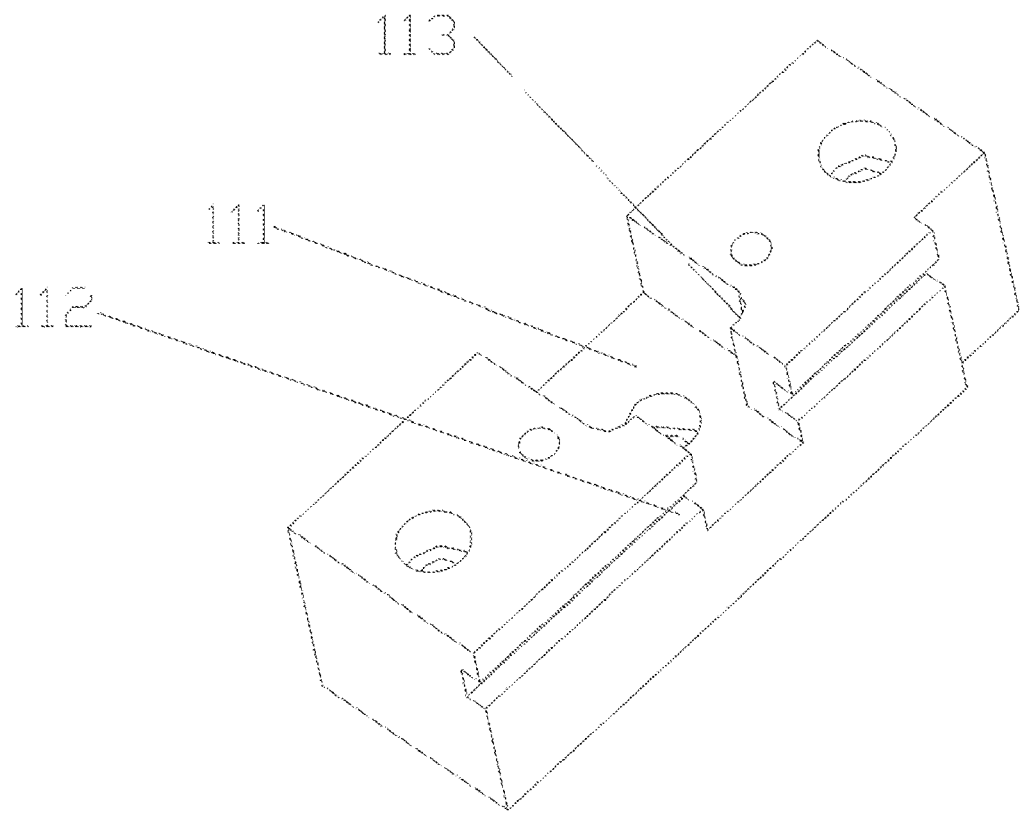
FIG. 7 is a schematic view showing the structure of a clamp of the present disclosure.
Figure 8:
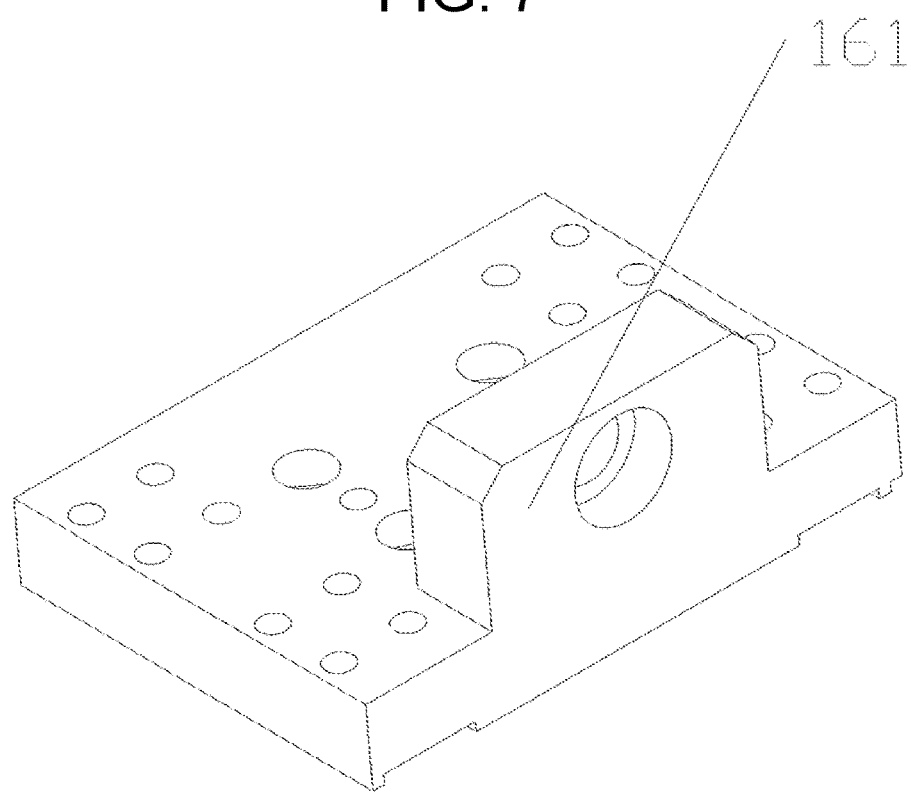
FIG. 8 is a schematic view showing the structure of a first small pallet of the present disclosure.

As shown in FIG. 1 to FIG. 7, a chain intelligent pre-tensioning and chain length detection device a rack 1, a work platform 2, a pre-tensioning power device, a measuring power device, a length measuring device and a console. The console is located beside the rack 1, and the console receives the information of the length measuring device to adjust and control the pre-tensioning power device. The work platform 2 is fixed on the top of the rack 2; the work platform 2 is provided with two large guide rails in parallel, and a first elongated through hole is disposed between the two large guide rails. The pre-tensioning power device includes a servo system 23, a decelerator, a belt, a second screw 24, a second nut 25, a first large pallet 13, a first fixing block 7, a pre-tensioning force sensor 8, a second fixing block 9, a second large pallet 14 and a fourth fixing block 12. The bottoms of the first large pallet 13 and the second large pallet 14 are slidably disposed on the large guide rails through a slider. One end of the first large pallet 13 is fixed with the first fixing block 7, one end of the second large pallet 14 adjacent to the first large pallet 13 is fixed with the second fixing block 9. One end of the pre-tensioning force sensor 8 is fixed to the second fixing block 9, and the other end is elastically connected to the first fixing block 7. The servo system 23, the decelerator and the second screw 24 are disposed at the bottom of the work platform 2 through the mounting plate 22, the decelerator drives the second screw 24 through the belt, and the second screw 24 is further provided with the second nut 25. The second nut 25 is fixed with the bottom of the first large pallet 13 after penetrating through the first elongated through hole, and the first large pallet 13 can move linearly along the large guide rails under the driving of the servo system 23. The second large pallet 14 is provided with two small guide rails in parallel, and a second elongated through hole is further provided between the two small guide rails. The measuring power device includes a stepper motor 19, a first screw 21, a first nut 20, a first small pallet 15, a measuring force sensor 10, a third fixing block 18, a second small pallet 16 and a fourth fixing block 12. The bottoms of the first small pallet 15 and the second small pallet 16 are slidably disposed on the small guide rails, and one end of the first small pallet 15 is provided with a protrusion 161 protruding upward. One end of the second small pallet 16 adjacent to the first small pallet 15 is fixed with the third fixing block 18, and the other end is fixed with a clamp 11. Two ends of the measuring force sensor 10 are respectively fixed to the protrusion 161 and the third fixing block 18. The stepper motor 19 and the first screw 21 are disposed at the bottom of the second large pallet 14, and the first screw 21 is further provided with a first nut 20. The first nut 20 is fixed to the bottom of the first small pallet 15 after penetrating through the second elongated through hole. The first small pallet 15 can be moved linearly along the small guide rails under the driving of the stepper motor 19. The length measuring device includes a grating ruler, a straight guide rail and an automatic measuring head disposed on one side of the work platform 2. A plurality of clamp fixing blocks 5 are distributed at equal distances on the work platform 2. The clamp fixing blocks 5 are fixed on the rack 1, the upper surfaces of the clamp fixing blocks 5 are lower than the work platform 2 and covered by a cover to maintain a level of the work platform. The corresponding clamp fixing block 5 can be selected according to a specific chain length to fix the clamp 11.

One end of the first fixing block 7 is provided with a T-shaped block 6, and a middle portion of the first fixing block 7 is provided with a through hole 71. A connecting pillar 61 in the middle portion of the T-shaped block 6 is fixed to the pre-tensioning force sensor 8 after penetrating through the through hole 71, and a compressing spring 17 is provided between the T-shaped block 6 and the first fixing block 7. The two sides of the connecting pillar 61 on the T-shaped block 6 are provided with a plurality of first recesses 62 for receiving the compressing springs 17 A plurality of second recesses 72 are disposed at positions on the first fixing block 7 corresponding to the first recesses 62. Two ends of the compressing spring 17 respectively abut against the bottom of the first recesses 62 and the second recesses 72. The buffering action of the spring prevents the chain from being damaged due to instantaneous overload caused by rigid loading of screw.

The upper end surface of the clamp 11 is provided with a longitudinal slot 111, and the side wall of the longitudinal slot 111 is provided with an arc-shaped folding step portion 113, and one side surface of the clamp 11 adjacent to the arc-shaped folding step portion 113 is provided with a lateral slot 112. The bottom in the middle portion of the lateral slot 112 communicates with the longitudinal slot 111.

One end of the second large pallet 14 away from the first large pallet 13 is fixed with the fourth fixing block 12 for preventing the second small pallet 16 from sliding out of the small guide rails, and the fourth fixing block 12 is provided with a slot for the chain to pass through.

The pre-tensioning force sensor 8, the measuring force sensor 10 and the longitudinal slot 111 of the clamp 11 are located on the same straight line. The second screw 24 and the servo system 23 are vertically disposed on the mounting plate 22, and the second screw 24 is located above the servo system 23.

A side baffle 3 is respectively disposed on an outer side of the two large guide rails on the work platform 2, and the two side baffles 3 are covered by an upper panel 4, and the upper panel 4 is provided with concavities conforming with the movement tracks of the first large pallet 13 and the second large pallet 14. The upper panel 4 is also provided with a concavity on the clamp 11.

A chain intelligent pre-tensioning and chain length detection method adopts the above-mentioned chain intelligent pre-tensioning and chain length detection device, and the steps are as follows:

a). Measuring an original length of a chain: Firstly, the appropriate clamp fixing block is selected according to the length of the chain to dispose a fixed end clamp, one end of the chain is connected to the clamp of the second small pallet, and the other end is connected to the fixed end clamp. The servo system is activated and moves the second nut to the right through the decelerator and the second screw. When the pre-tensioning force reaches a chain tensioning and unloading force Fa, the servo system stops loading and holds still. Then the stepper motor is activated and drives the first screw to move the first nut to the right. When the measuring force reaches Fc, the stepper motor stops and maintains the measuring force to be equal to Fc. The automatic measuring head is activated and moves along the straight guide rail to "initial clear position for measurement of grating ruler", and then the automatic measuring head is moved to the clamp measuring basis surface on the second small pallet to measure a coordinate of the chain moving end. The automatic measuring head is moved to the clamp on the work platform for fixing the chain to measure a coordinate of the fixing end of the chain while automatically calculating an absolute value of the chain length. The automatic measuring head returns to a zero point and the measurement of an original chain length is completed;

b). A first pre-tensioning: The first nut is moved to the left to unload the measuring force. When the measuring force is unloaded to a chain tensioning and unloading force Fa and stops, the servo system is activated. The second nut is moved to the right. When the pre-tensioning force reaches a value F1 in a parameter table selected according to the deviation of the chain length and stops, the pre-tensioning force is maintained to a specified time, and the first pre-tensioning is completed;

c). After the first pre-tensioning, the chain length is measured: The second nut is moved to the left to unload the pre-tensioning force. When the pre-tensioning force reaches the chain tensioning and unloading force Fa, the servo system stops moving, and the stepper motor is activated. The first nut is moved to the right. When the measuring force reaches Fc, the stepper motor stops and the measuring force is maintained to be equal to Fc. The automatic measuring head is activated and moved along the straight guide rail to "initial clear position for measurement of grating ruler", and the automatic measuring head is moved to the clamp measuring basis surface on the second small pallet to measure a coordinate of a moving end of the chain. The automatic measuring head is moved to the clamp on the work platform for fixing the chain to measure the coordinate of the fixing end of the chain while automatically calculating the absolute value of the chain. The automatic measuring head returns to the zero point, and the first chain length measurement is completed. It is determined whether to perform the pre-tensioning and measurement again according to a result of chain length;

d). If it is necessary to perform the pre-tensioning and measuring again, step b) and step c) are repeated until the chain length meets the process requirement, thereby completing pre-tensioning and measurement of the chain.

The pre-tensioning force and measuring force of the chain are calculated based on the percentage of the chain tensile strength Fu. The pre-tensioning force of the standard roller chain is 30%-60% Fu, and the measuring force when measuring the chain length is 1% Fu, the pre-tensioning force of the chain with the agreed specification is 30 times or more of the measuring force. If the pre-tensioning and length measurement of the chains with different specifications are on one facility, the pre-tensioning force of the large-size chain is 100 times or more of the measuring force of the small-size chain, or even up to 300 times. If a set of power system is adopted, the precision of the required loading and measuring system is very high, and the speed of loading and unloading is reduced when the precision is high. The pre-tensioning force and measuring force of the chain differ from each other significantly. The pre-tensioning and chain length measurement adopts a combination structure of an independently operated screw loading system as well as 2 sets of unique straight guide rails and 4 pallets mounted on the guide rail. In the meantime, two sets of loading systems are adopted. The pre-tensioning force loading adopts the servo system and works with decelerator and precision grinding screw for loading. The measuring force loading adopts stepper motor and works with precision grinding screw for loading. The pre-tensioning and measurement adopt two tensile force sensors, so that chain pre-tensioning force and the chain length measuring force can be controlled accurately. Through the above configuration, the accuracy of chain length measurement can be ensured, and the pre-tensioning force and the measuring force can be set manually, which increases flexibility of facility.

The disclosure can automatically record and save parameters such as chain specification, pre-tensioning force, pre-tensioning time, chain length and chain length variation, the recorded data can be exported, and the recording format is adjusted according to specific requirement. The whole machine of the disclosure has an automatic constant temperature system, which can effectively avoid dimensional changes caused by temperature difference during measurement.

It should be noted that the above embodiments are merely representative examples of the present disclosure. The disclosure can also be modified in many ways. Any simple modifications, equivalent changes and amendments made to the above embodiments in light of the spirit of the disclosure are considered to be within the scope of the disclosure.

What is claimed is:

1. A chain intelligent pre-tensioning and chain length detection device, comprising:
   a rack;
   a work platform, fixed on a top of the rack, the work platform is provided with two large guide rails in parallel, and a first elongated through hole is disposed between the two large guide rails;
   a pre-tensioning power device;
   a measuring power device;
   a length measuring device; and
   a console;
   wherein the console is located beside the rack, and the console receives information of the length measuring device to adjust and control the pre-tensioning power device,
   wherein the pre-tensioning power device comprises a servo system, a decelerator, a belt, a second screw, a second nut, a first large pallet, a first fixing block, a pre-tensioning force sensor, a second fixing block, a second large pallet and a fourth fixing block, bottoms of the first large pallet and the second large pallet are slidably disposed on the two large guide rails through a slider, one end of the first large pallet is fixed with the first fixing block, one end of the second large pallet adjacent to the first large pallet is fixed with the second fixing block, one end of the pre-tensioning force sensor is fixed to the second fixing block, and the other end of the pre-tensioning force sensor is elastically connected to the first fixing block, the servo system, the decelerator and the second screw are disposed at bottom of the work platform through a mounting plate, the decelerator drives the second screw through the belt, and the second screw is further provided with the second nut, the second nut is fixed with bottom of the first large pallet after penetrating through the first elongated through hole, the first large pallet can move linearly along the two large guide rails under the driving of the servo system; the second large pallet is provided with two small guide rails in parallel, and a second elongated through hole is further provided between the two small guide rails;

the measuring power device comprises a stepper motor, a first screw, a first nut, a first small pallet, a measuring force sensor, a third fixing block, a second small pallet and a fourth fixing block, wherein bottoms of the first small pallet and the second small pallet are slidably disposed on the two small guide rails, one end of the first small pallet is provided with a protrusion protruded upward, one end of the second small pallet adjacent to the first small pallet is fixed with a third fixing block, and the other end of the second small pallet is fixed with a clamp, two ends of the measuring force sensor are respectively fixed to the protrusion and the third fixing block, the stepper motor and the first screw are disposed at bottom of the second large pallet, and the first screw is further provided with the first nut, the first nut is fixed to bottom of the first small pallet after penetrating through the second elongated through hole, the first small pallet can move linearly along the two small guide rails under the driving of the stepper motor;

the length measuring device comprises a grating ruler, a straight guide rail and an automatic measuring head disposed on one side of the work platform, a plurality of clamp fixing blocks are further distributed at equal distance on the work platform, the plurality of clamp fixing blocks are fixed on the rack, upper surfaces of the plurality of clamp fixing blocks are lower than the work platform and covered by a cover to maintain a level of the work platform, the corresponding clamp fixing block can be selected according to a specific chain length to fix the clamp.

2. The chain intelligent pre-tensioning and chain length detection device according to claim 1, wherein one end of the first fixing block is provided with a T-shaped block, a middle portion of the first fixing block is provided with a through hole, a connecting pillar in a middle portion of the T-shaped block is fixed with the pre-tensioning force sensor after penetrating through the through hole, and a compressing spring is provided between the T-shaped block and the first fixing block.

3. The chain intelligent pre-tensioning and chain length detection device according to claim 2, wherein two sides of the connecting pillar on the T-shaped block are provided with a plurality of first recesses for receiving the compressing spring, a plurality of second recesses are disposed in positions on the first fixing block corresponding to the plurality of first recesses, two ends of the compressing spring respectively abut against bottoms of the plurality of first recesses and the plurality of second recesses.

4. The chain intelligent pre-tensioning and chain length detection device according to claim 1, wherein one end of the second large pallet away from the first large pallet is fixed with the fourth fixing block for preventing the second small pallet from sliding out of the two small guide rails, the fourth fixing block is provided with a slot for a chain to pass through.

5. The chain intelligent pre-tensioning and chain length detection device according to claim 1, wherein the pre-tensioning force sensor, the measuring force sensor and a longitudinal slot of the clamp are located on the same straight line.

6. The chain intelligent pre-tensioning and chain length detection device according to claim 1, wherein the second screw and the servo system are disposed vertically on the mounting plate, and the second screw is located above the servo system.

7. The chain intelligent pre-tensioning and chain length detection device according to claim 1, wherein a side baffle is disposed respectively on an outer side of the two large guide rails of the work platform, the two side baffles are covered by an upper panel, and the upper panel is provided with concavities conforming to movement tracks of the first large pallet and the second large pallet, and the upper panel is provided with a concavity in the clamp.

8. A chain intelligent pre-tensioning and chain length detection method, the method comprising the steps of:
providing the chain intelligent pre-tensioning and chain length detection device according to claim 1;
a) measuring an original length of a chain, wherein the appropriate clamp fixing block is selected according to a length of the chain to dispose a fixed end clamp, one end of the chain is connected to the clamp of the second small pallet, and the other end of the chain is connected to the fixed end clamp, the servo system is activated and moves the second nut to the right through the decelerator and the second screw, when a pre-tensioning force reaches a chain tensioning and unloading force, the servo system stops loading and holds still; then the stepper motor is activated and drives the first screw to move the first nut to the right, when a measuring force reaches a predetermined value, the stepper motor stops and maintains the measuring force to be equal to the predetermined value; the automatic measuring head is activated and moves along the straight guide rail to "initial clear position for measurement of grating ruler", and then the automatic measuring head is moved to a clamp measuring basis surface on the second small pallet to measure a coordinate of the chain moving end, the automatic measuring head is moved to the clamp on the work platform for fixing the chain to measure a coordinate of the fixing end of the chain while automatically calculating an absolute value of a chain length, the automatic measuring head returns to a zero point and the measurement of an original chain length is completed;
b) preforming a first pre-tensioning, wherein the first nut is moved to the left to unload the measuring force, when the measuring force is unloaded to the chain tensioning and unloading force and stops, the servo system is activated, the second nut is moved to the right, when the pre-tensioning force reaches a value in a parameter table selected according to a deviation of the chain length and stops, the pre-tensioning force is maintained to a specified time, and the first pre-tensioning is completed;
c) measuring the chain length after the first pre-tensioning, wherein the second nut is moved to the left to unload the pre-tensioning force, when the pre-tensioning force reaches the chain tensioning and unloading force, the servo system stops moving, and the stepper motor is activated, the first nut is moved to the right, when the measuring force reaches the predetermined value, the stepper motor stops and the measuring force is maintained to be equal to the predetermined value, the automatic measuring head is activated and moved along the straight guide rail to "initial clear position for measurement of grating ruler", and the automatic measuring head is moved to the clamp measuring basis surface on the second small pallet to measure a coordinate of a moving end of the chain, the automatic measuring head is moved to the clamp on the work platform for fixing the chain to measure the coordinate of the fixing end of the chain while automatically calculating the absolute value of the chain, the automatic measuring head returns to the zero point, and the first chain length measurement is completed, it is determined whether to perform the pre-tensioning and measurement again according to a result of chain length;

d) if it is necessary to perform the pre-tensioning and measurement again, step b) and step c) are repeated until the chain length meets a process requirement, thereby completing pre-tensioning and measurement of the chain.

\* \* \* \* \*